United States Patent [19]
Vieri

[11] 3,904,961
[45] Sept. 9, 1975

[54] DYNAMIC LINEARIZER FOR ELECTROMAGNETICALLY DRIVEN MOVING COIL DEVICES

[75] Inventor: Bruno J. Vieri, Dallas, Tex.

[73] Assignee: Xerox Corporation, Stamford, Conn.

[22] Filed: Oct. 1, 1973

[21] Appl. No.: 402,541

Related U.S. Application Data

[63] Continuation of Ser. No. 227,938, Feb. 22, 1972, abandoned.

[52] U.S. Cl. ................................ 324/125; 324/132
[51] Int. Cl.² ..................... G01R 1/14; G01R 15/10
[58] Field of Search ............ 324/125, 132; 318/138, 318/621

[56] References Cited
UNITED STATES PATENTS

| | | | |
|---|---|---|---|
| 2,511,485 | 6/1950 | Strobel | 324/125 |
| 2,896,164 | 7/1959 | Bizouard et al. | 324/125 |
| 3,246,220 | 4/1966 | Shinners | 318/621 |

*Primary Examiner*—Robert J. Corcoran
*Assistant Examiner*—Ernest F. Karlsen

[57] ABSTRACT

To linearize the dynamic response characteristic of a galvanometer or similar electromagnetically driven moving coil device, there is a compensating network having a transfer function proportional to the reciprocal of the forward transfer function of the device.

2 Claims, 2 Drawing Figures

DYNAMIC LINEARIZER FOR ELECTROMAGNETICALLY DRIVEN MOVING COIL DEVICES

A CROSS REFERENCE TO A RELATED APPLICATION

This is a continuing application based on and claiming the benefit of the Feb. 22, 1972 filing date of an earlier U.S. patent application filed by Bruno J. Vieri under Ser. No. 227,938, now abandoned, for a "Galvanometer Correction Circuit".

BACKGROUND OF THE INVENTION

This invention relates to electromagnetically driven moving coil devices and, more particularly, to methods and means for linearizing the dynamic response characteristics of such devices.

It may be helpful to take a conventional galvanometer as an example of what is referred to herein as "an electromagnetically driven moving coil device". As is known, a galvanometer typically has a coil suspended in a magnetic field. In operation, a current is applied to the coil and any change in the magnitude or polarity of that current upsets the equilibrium of the galvanometer, thereby tending to cause the coil to rotate until it reaches a new equilibrium position.

Electromagnetically driven moving coil devices having substantial static linearity are available, and sometimes little more is required. For example, manufacturers often specify galvanometer sensitivity from a static or steady point of view in terms of a predetermined amount of coil deflection expected per unit current, and such galvanometers have been widely and successfully used for measuring DC currents and the like. There are, however, instances in which the dynamic response characteristics of such devices are of more direct concern. A case in point involves optical scanners that are characterized by having a galvanometer for oscillating a mirror such that a light beam reflected from the mirror is swept back and forth across a target.

Unfortunately, galvanometers and other electromagnetically driven moving coil devices suffer from dynamic non-linearity. This limits their utility, but little has been accomplished by the known prior art toward solving the problem. The absence of any substantial progress toward dynamically linear moving coil devices is surprising, especially since it is known that the principal cause of the non-linearity is the inherent inertia and damping (i.e., internal energy dissipation) of such devices. Still, the existing practice is to adjust the damping as necessary to achieve an overdamped, underdamped or critically damped condition, with critical damping being the alternative most commonly selected. In other words, attention has been focused on the transient response characteristics of such devices to the exclusion of any meaningful attempt to achieve dynamic linearity.

SUMMARY OF THE INVENTION

In contrast, the primary aim of the present invention is to provide method and means for linearizing the dynamic response characteristics of galvanometers and other electromagnetically driven moving coil devices. More particularly, an object is to provide a compensating network for substantially cancelling the effects of the inherent inertia and damping characteristics of such devices.

To carry out these and other objects of the invention, there is a compensating network having a transfer function which is proportional to the reciprocal or complement of the forward transfer function of the moving coil device. Because of its complementary characteristic, the compensating network automatically tailors the driving current for the moving coil device so that the effects of the inherent inertia and damping of that device are substantially cancelled. This means that the device operates essentially inertia free and undamped and enjoys substantial dynamic linearity, at least up to the limit imposed by any mechanical imbalance of the device. Accordingly, improved tracking of time varying input signals is obtained.

BRIEF DESCRIPTION OF THE DRAWINGS

Still further objects and advantages of this invention will become apparent when the following detailed description is read in conjunction with the attached drawings, in which.

DETAILED DESCRIPTION OF THE ILLUSTRATED EMBODIMENTS

While the invention is described in some detail hereinafter with specific reference to a single illustrated embodiment, it is to be understood that the intent is not to limit it to that embodiment. On the contrary, the intent is to cover all modifications, alternatives and equivalents falling within the spirit and scope of the invention as defined by the appended claims.

Turning now to the drawings, it will be seen that there is an optical scanner 11 (FIG. 2) having a galvanometer G for oscillating a mirror 12 through an angle of, say, ±10° in response to a time varying input signal $v(t)$. For purposes of discussion, it may be assumed that the input signal $v(t)$ is a periodic sawtooth signal and that the galvanometer G has a natural frequency of 1500 Hz.

As a general rule, it is desirable to minimize the portion of each scan cycle that need be set aside to provide retrace time. That is one reason for driving the galvanometer G with a sawtooth signal. However, experience has demonstrated that the scanner 11 with its 1500 Hz. galvanometer G would normally require a retrace time of at least 1,000 microseconds or so because of the inherent inertia and damping of the galvanometer. It is, therefore, noteworthy that the compensation which is provided for the galvanometer G in accordance with this invention (FIG. 1) substantially cancels the effects of its inertia and damping, thereby reducing the lower limit for the retrace time to approximately 300 microseconds. At this point, the mechanical balance that may be achieved for the galvanometer G with state of the art manufacturing techniques is the constraining factor that prevents even further reduction of the retrace time for the scanner 11.

Figure 2:
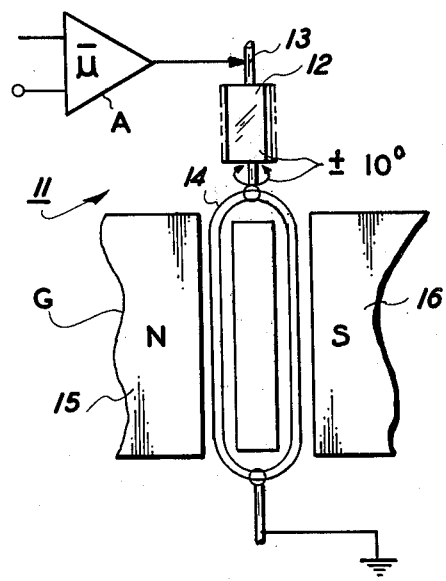
FIG. 2 is a simplified fragmentary view of a conventional optical scanner with which this invention may be advantageously utilized.

Apart from the compensation, the galvanometer G is conventional. As shown in FIG. 2, it has a suspension 13 for supporting a coil 14 in the magnetic field existing between the poles 15 and 16 of a permanent magnet. The mirror 12 is mounted on the upper part of the suspension 13, and there is a path for applying driving current to the galvanometer coil 14. Specifically, that path runs from the output of a driver amplifier A, through the upper part of the suspension 13 to the coil 14, and then through the lower part of the suspension 13 to ground.

For a full understanding of this invention, some mathematical background is desirable. As a matter of definition, the galvanometer G is a dynamically linear device if:

$$\theta(t) = K_1 v(t) \tag{1}$$

where:
$\theta(t)$ = the angular deflection of the galvanometer coil as a function of time;
$k_1$ = a proportionality constant; and
$v(t)$ = the time varying input signal.

The time domain relationship between the coil deflection $\theta(t)$ and the galvanometer driving current $i(t)$ involves an awkward convolution integral, but the complex frequency domain relationship is relatively straightforward. Expressed in Laplace transforms it is:

$$\theta(s) = I(s) T(s) \tag{2}$$

where:
$\theta(s)$ = the Laplace transform of $\theta(t)$;
$I(s)$ = the Laplace transform of $i(t)$; and
$T(s)$ = the Laplace transform of the galvanometer response to a unit impulse of current (hereinafter referred to as its "forward transfer function")

The waveform of the desired coil deflection is predetermined. For instance, here it has been assumed to be a sawtooth. Thus, the Laplace transform $\theta(s)$ for the coil deflection $\theta(t)$ is fully defined. Furthermore, it is known that the galvanometer G is a damped second order harmonic device. That means that the Laplace transform $T(s)$ for its forward transfer function is given by:

$$T(s) = \frac{h}{\left(\frac{s}{2\pi f_n}\right)^2 + \frac{\gamma s}{\pi f_n} + 1} \tag{3}$$

where:
$h$ = the galvanometer sensitivity in radians/amp.;
$f_n$ = the undamped natural frequency of the galvanometer in Hz.; and
$\gamma$ = the damping coefficient of the galvanometer.

Returning to equation (2), it will be seen that the defined terms $\theta(s)$ and $T(s)$ lead to a unique solution for the remaining term $I(s)$. Accordingly, the driving current $i(t)$ necessary to provide the desired coil deflection $\theta(t)$ can be determined. Nevertheless, there still is the problem of providing a practical implementation for this theory.

In keeping with this invention, a simple solution to the practical problem is provided. The approach suggested by equation (2) of using a current generator designed to directly supply the necessary driving current $i(t)$ is avoided because of the complex characteristics of that current. Instead there is a compensating network 21 (FIG. 1) for providing the driving current $i(t)$ in response to the input voltage $v(t)$.

More particularly, it has been recognized that the addition of a compensating network 21 having a transfer function proportional to the reciprocal (i.e., complement) of the forward transfer function of the galvanometer G permits equation (2) to be rewritten as follows:

$$\theta(s) = V(s) Y(s) T(s) \tag{4}$$

where:
$V(s)$ = the Laplace transform of the input voltage $v(t)$; and
$Y(s)$ = the Laplace transform of the transfer function of the compensating network.

Since $Y(s)$ is proportional to $1/T(s)$, equation (4) may be simplified to become:

$$\theta(s) = \frac{(K_2 V(s))}{T(s)} T(s) \tag{5}$$

or, in even simpler form;

$$\theta(s) = K_2 V(s) \tag{6}$$

where: $K_2$ = a proportionality constant

Equation (6) is, of course, expressive of a dynamically linear relationship, as may be confirmed by comparing it with equation (1).

Figure 1:
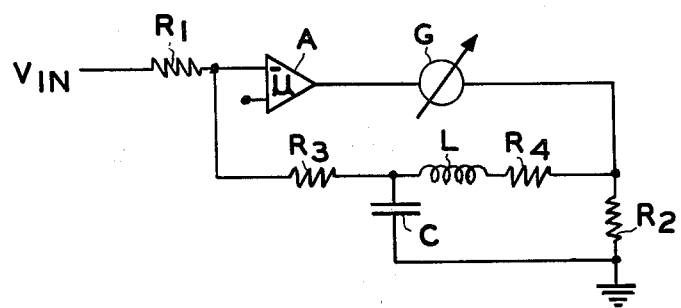
FIG. 1 is a simplified schematic diagram of a galvanometer with a compensating network constructed in accordance with this invention.

In the exemplary embodiment shown in FIG. 1, the compensating network 21 includes a feedback loop for shaping the closed loop gain or transfer function of the driver amplifier A so that it is proportional to the reciprocal of the forward transfer function of the galvanometer G. Preferably, the driver amplifier A is an operational amplifier having its inverting input coupled to receive the input signal $v(t)$ via an input resistor $R_1$ and its non-inverting input returned (by means not shown) to a suitable reference potential, such as ground. The compensating network 21, in turn, comprises a resistor $R_2$ in the return path for the galvanometer driving current $i(t)$, an inductor L and a capacitor C for frequency shaping, and two additional resistors $R_3$ and $R_4$ for weighting.

As shown, the resistor $R_1$ is connected between one end of the inductor L and a junction intermediate the galvanometer G and the resistor $R_2$. The other end of the inductor L is returned to ground through the capacitor C and is connected to the inverting input of the amplifier A by the resistor $R_3$. Thus, a Kirchoff's law-type analysis of the compensating network 21 confirms that the feedback coefficient $\beta$ for the closed loop gain of the amplifier A has the following Laplace tranform:

$$\beta(s) = \frac{R_2 R_3}{s^2(LCR_3) + s[LC + CR_2(R_2+R_1)] + (R_2+R_3+R_1)} \tag{7}$$

Furthermore, since the driver amplifier A has been assumed to have an extremely high open loop gain $\mu$, its closed loop gain or transfer function is closely approximated by $$\lim_{\mu \to \infty} \frac{R_1}{R_1 \beta} \tag{8}$$

Now it will be observed that if:

$$R_2 + R_3 + R_1 = R_t \tag{9}$$

equation (7) may be rewritten in the form of equation (3) as follows:

$$\beta(s) = \frac{R_2R_3/R_t}{S^2(LCR_3)/R_t + S[L+CR_3(R_2+R_1)]/R_t + 1} \quad (10)$$

Substituting equation (10) into equation (8) leads to the conclusion that the closed loop DC gain or transfer function for the amplifier A is given by;

$$\frac{i}{V} = \frac{R_3T_t}{R_1R_2R_3} \quad (11)$$

Finally, solving equation (10) for the values necessary to have the transfer function of the compensating network 21 proportional to the reciprocal of the forward transfer function of the galvanometer G leads to:

$$LC = \frac{R_t}{R_3(2\pi f_n)2} \quad (12)$$

and $$L+CR_3(R_2+R_1) = \frac{\gamma R_t}{\pi f n} \quad (13)$$

Equations (12) and (13) are simultaneous equations from which the appropriate values for the inductor L and the capacitor C may be determined for any given values of the resistors $R_2$, $R_3$ and $R_4$. The undamped natural frequency $f_n$ and the damping coefficient $\gamma$ of the galvanometer G are, of course, determinable. Therefore, to simplify the solution for L and C, let:

$$a = LC; \quad (14a)$$

$$b = R_3(R_2+R_1); \text{ and} \quad (14b)$$

$$d = L+bC \quad (14c)$$

Then:

$$L = \frac{d}{2} \pm \sqrt{\frac{d^2}{4} - ab} \text{ Henries} \quad (15)$$

and $$C = \frac{a}{L} \text{ Farads} \quad (16)$$

From the foregoing, it will now be appreciated that a compensating network for linearizing the dynamic response characteristics of galvanometers and other electromagnetically driven moving coil devices has been provided. The compensating network has a transfer function proportional to the reciprocal of the forward transfer function of the device that is linearized and is suitably, but not necessarily, a feedback-type circuit.

What is claimed is:

1. In a system for electromagnetically driving a moving coil device having a predetermined impulse response characteristic, said system including
    an operational amplifier having its output coupled to provide driving current to said device and its input coupled to receive a driving signal,
    an impedance coupled in the return path of the current to said device, and
    feedback means coupled between said impedance and the input of said amplifier,
    the improvement comprising three terminal network means connected in said feedback means for providing a transfer function substantially proportional to the reciprocal of said impulse response characteristic.

2. The improvement of claim 1 wherein said impedance comprises a first resistor and said three terminal network means comprises
    a second resistor and an inductor connected in series and to a junction between a first end of said first resistor and said device,
    a third resistor connected between said amplifier input and said series connected second resistor and inductor, and
    a capacitor connected between the junction of said third resistor and said series connected second resistor and inductor and the second end of said first resistor.

* * * * *